United States Patent
Lanz

(10) Patent No.: US 10,196,105 B2
(45) Date of Patent: Feb. 5, 2019

(54) BICYCLE HANDLEBAR STEM WITH ADJUSTABLE INCLINATION

(71) Applicant: LOOK CYCLE INTERNATIONAL, Nevers (FR)

(72) Inventor: Matthieu Lanz, Nevers (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 14/400,805

(22) PCT Filed: May 3, 2013

(86) PCT No.: PCT/FR2013/051002
§ 371 (c)(1),
(2) Date: Nov. 13, 2014

(87) PCT Pub. No.: WO2013/171406
PCT Pub. Date: Nov. 21, 2013

(65) Prior Publication Data
US 2015/0158545 A1      Jun. 11, 2015

(30) Foreign Application Priority Data
May 14, 2012   (FR) ..................... 12 54385

(51) Int. Cl.
*B62K 21/16*       (2006.01)
(52) U.S. Cl.
CPC ......... *B62K 21/16* (2013.01); *Y10T 74/20792* (2015.01)
(58) Field of Classification Search
CPC ................................ B62K 21/16; B62K 21/18
(Continued)

(56) References Cited

U.S. PATENT DOCUMENTS

| 1,232,871 A | * | 7/1917 | Watters | .................. F16C 11/10 403/97 |
| 5,429,381 A | | 7/1995 | Mercat | |

(Continued)

FOREIGN PATENT DOCUMENTS

| EP | 0662419 | 7/1995 |
| EP | 2248716 | 11/2010 |

(Continued)

OTHER PUBLICATIONS

International Search Report dated Sep. 16, 2013, corresponding to PCT/FR2013/051002.

*Primary Examiner* — Vicky A Johnson
(74) *Attorney, Agent, or Firm* — Ipsilon USA, LLP

(57) ABSTRACT

A stem includes a stem body, one of the extremities of which includes element for attaching a handlebar, the opposite extremity including two parallel arms connected to a pivot tube by an articulation associated with clamping element which immobilize the stem in a chosen position. The clamping element includes a pair of frustoconical bodies connected to the extremities of the arms. The frustoconical bodies are received in housings of complementary shape. The frustoconical bodies are connected by a connecting element capable of moving them closer to one another in order to clamp them in the respective housing, and of loosening them by moving them further apart one from the other so as to allow the continuous adjustment of the inclination of the handlebar. The cone angle of the frustoconical bodies possesses a sufficiently low value to permit them to be pinched inside their housings.

11 Claims, 4 Drawing Sheets

(58) Field of Classification Search
USPC .......................................................... 74/551.3
See application file for complete search history.

(56) References Cited

U.S. PATENT DOCUMENTS

| | | | |
|---|---|---|---|
| 5,515,744 A | 5/1996 | Liao | |
| 5,536,102 A * | 7/1996 | Kao | B62K 21/12 403/320 |
| 6,244,131 B1 | 6/2001 | Liao | |
| 8,307,735 B2 * | 11/2012 | Wehage | B62K 21/16 74/551.3 |
| 8,578,814 B2 | 11/2013 | Servet | |
| 2006/0096407 A1 * | 5/2006 | Liao | B62K 21/16 74/551.1 |
| 2011/0107872 A1 | 5/2011 | Servet | |
| 2013/0298720 A1 * | 11/2013 | Lanz | B62K 21/16 74/551.8 |

FOREIGN PATENT DOCUMENTS

WO          03/033335     4/2003
WO    WO 03033335 A1 *   4/2003  ............. B62K 21/16

* cited by examiner

BICYCLE HANDLEBAR STEM WITH ADJUSTABLE INCLINATION

BACKGROUND OF THE INVENTION

Field of the Invention

The present invention relates to a bicycle stem with adjustable inclination. The stem carries the handlebar of the bicycle at one of its extremities and is attached at its opposite extremity to the upper part of the pivot tube that is rotatably mounted in the head tube of the bicycle frame.

The advantage of the adjustable inclination of the stem lies in the fact that it can be adapted to make it convenient for persons who adopt a different position on the bicycle.

Description of the Related Art

In order to be able to adjust the inclination of the stem, the means for the attachment of the stem to the pivot tube include an articulation associated with clamping means, as is already familiar for example, from publications U.S. Pat. No. 5,515,744, or from publications EP2248716 or EP0662419 by the applicant. According to these documents, the stem can be immobilized in a selected inclination thanks to the clamping means.

However, one of the disadvantages associated with devices of this kind is that the clamping has a tendency to slip and to entail an undesired modification to the angle of inclination.

It is for this reason that, in the devices according to U.S. Pat. No. 5,515,744 and EP2248716, the stem is immobilized in an angular position with the help of notches arranged on the touching cylindrical clamping surfaces. This results in another disadvantage, namely the impossibility of obtaining a continuous adjustment, because the adjustment has to be made in steps of, for example, 3 degrees, which results in a difference in height of 3 to 5 mm for each notch at the tip of the stem. Precisely the same disadvantages are similarly encountered in document U.S. Pat. No. 6,244,131, which utilizes conical clamping surfaces provided with notches.

In the device according to EP0662419, it has been necessary in practice to add anti-slip washers to either side of the articulation and to utilize a screw of relatively large size to form the axis of the articulation in order to withstand a high tightening torque.

Document WO03/033335 describes a stem with adjustable inclination, in which the device for adjusting the inclination includes smooth conical clamping surfaces on projections arranged opposite one another engaging in corresponding recesses in such a way as to constitute a pivot. The frustoconical projections are acted upon one in the direction of the other in the recesses by a large central screw which passes through a central hole in one of the projections so as to enable it to be screwed into a central threaded hole provided in the opposite projection. The attachment capacity is based on friction. However, in order to prevent pinching of the frustoconical projections, it is not advisable to provide a cone angle of less than 15°. In order to be certain to avoid this undesired pinching of the conical shapes one in the other, this document further proposes the use of a split element constituted by an intermediate conical sleeve positioned between each projection and its receiving recess.

The majority of known stems of this kind are relatively complicated in terms of their construction, furthermore, and include a large number of component parts to be assembled, which results in a high weight and cost and often, in addition, in a loss of rigidity of the assembly.

SUMMARY OF THE INVENTION

The purpose of the invention is to propose a bicycle stem having continuously adjustable inclination of the stem in the absence of any risk of slipping and without the requirement for a high clamping torque. Unlike document WO03/033335, the invention benefits from the pinching of conical shapes in order to immobilize the pivot in a stable manner.

In addition, the stem according to the invention includes very few component parts, which imparts an improved rigidity to the assembly.

The object of the invention is a bicycle stem with adjustable inclination, comprising a stem body, one of the extremities of which includes means of attaching a handlebar, the opposite extremity including two parallel arms capable of being connected to a fork pivot tube by an articulation associated with clamping means capable of immobilizing the stem in a position corresponding to a chosen angle of inclination, the said clamping means including a pair of smooth frustoconical bodies connected to the internal faces of the corresponding extremities of the said arms, the said frustoconical bodies constituting part of the articulation by being received in smooth housings of complementary shape formed to one side and the other of the articulation, the said frustoconical bodies being connected one to the other by connecting means so as to make it possible to move them closer to one another in order to clamp them in the respective housing of the articulation, and to loosen them by moving them further apart one from the other in order to perform a continuous adjustment of the inclination of the handlebar, characterized in that the cone angle of the frustoconical bodies possesses a sufficiently low value to obtain pinching of the frustoconical bodies inside the said housings of complementary shape.

According to other characterizing features of the invention:

- the said cone angle is less than 15°;
- the said cone angle is about 10°;
- the said connecting means include a plurality of screws extending via a respective first bore provided alternately in one and the other of the said arms of the stem body, the said first bore being capable of alignment with a second bore provided in one of the frustoconical bodies so as to allow the said screws to be screwed into a respective threaded hole provided on the internal face of the other frustoconical body;
- a means of expulsion of the frustoconical bodies is provided between them, the said means of expulsion being capable of releasing the frustoconical bodies from their respective housing;
- the said means of expulsion includes an expulsion screw that is screwed into a central threaded hole of one of the frustoconical bodies, and of which the head is accommodated in a central recess in the internal face of the other frustoconical body, which further exhibits a central transcurrent hole aligned with a transcurrent hole of one of the said arms so as to provide access from the outside to the head of the expulsion screw so that, when the said screw is unscrewed, the frustoconical bodies are loosened from their respective housing;
- the said frustoconical bodies are added components;
- the stem body is formed by two parallel arms, and each frustoconical body of the said pair of frustoconical bodies is integral with a respective arm;

the said connecting means include a double-threaded screw cooperating with a central threaded hole on the internal face of the opposite frustoconical bodies;

the said double-threaded screw includes in a central section two spaced flanges, one of which includes on its periphery two diametrically opposed flats permitting the double-threaded screw to be introduced, by inclining it, through a central hole of a separating wall separating the said housings from the frustoconical bodies in order to position the flanges to either side of the separating wall in such a way that an expulsion means is obtained when one or other of the flanges abuts against the said separating wall;

the stem includes, at its extremity for the attachment of a handlebar, a second pair of frustoconical bodies that are accommodated in complementary recesses provided in a support member carrying the said means for the attachment of a handlebar, in such a way as to form a second articulation;

The invention also relates to a bicycle equipped with a stem exhibiting the essential characterizing features of the invention.

BRIEF DESCRIPTION OF THE DRAWING FIGURES

Other characterizing features and advantages of the invention will be appreciated from the following description of two non-restrictive embodiments of the invention with reference to the accompanying figures, in which.

In the figures, identical or equivalent elements will carry the same reference designations.

DETAILED DESCRIPTION OF THE INVENTION

Figure 1:
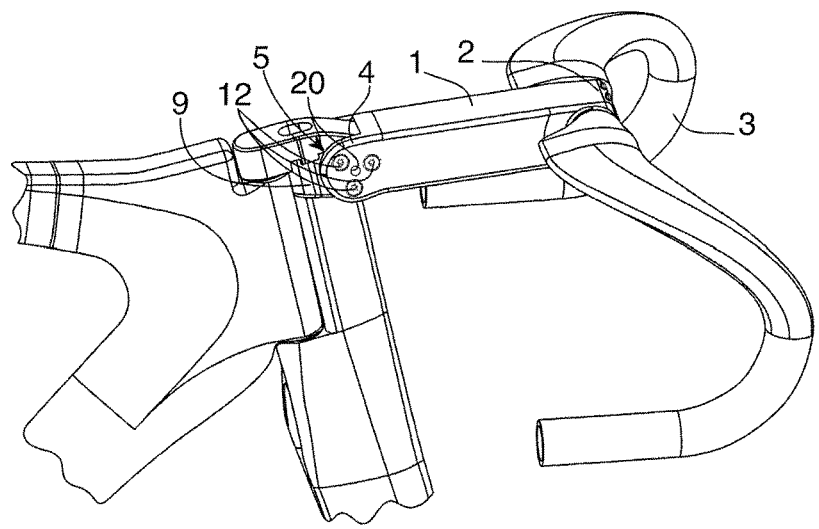
FIG. 1 is a partial side view of a bicycle equipped with a stem according to the invention.

FIG. 1 depicts a stem including a stem body 1, of which one of the extremities, being the front extremity, includes means 2 for the attachment of a handlebar 3, whereas the opposite extremity, being the rear extremity, includes two parallel arms 4 connected to a fork pivot tube via an articulation 5.

The articulation 5 is associated with clamping means that are capable of immobilizing the stem 1 in a position corresponding to a selected angle of inclination.

According to one essential characterizing feature of the invention, these clamping means include a pair of frustoconical bodies 6, 7 connected to the internal faces of the extremities of the parallel arms 4 of the stem body 1 and constitute part of the articulation 5. These frustoconical bodies 6, 7 are, in a first embodiment, added components arranged at the extremities of the arms 4.

This first embodiment of the invention is now described below with reference to FIGS. 1 to 7.

The articulation 5 includes a circular transcurrent hole 8 made in a connecting component 9 to the pivot tube of the bicycle (not illustrated).

The frustoconical bodies 6, 7 are received in housings 10, 11 of complementary shape that are formed to either side of the articulation 5 (see FIG. 2), constituting part of the latter. The frustoconical bodies 6, 7 are thus rotatably mounted in their respective housing 10, 11 and, as such, define the axis of rotation A-A of the articulation 5.

The frustoconical bodies 6, 7 are connected to one another by connecting means which, in this first embodiment, include a plurality of screws 12 which connect the arms 4 of the stem body 1 to the articulation 5 by extending via a respective first bore 13 that is provided alternately in one and other of the arms 4, the first bore 13 being capable of alignment with a second bore 14 provided in one of the frustoconical bodies 6, 7 in order to permit the screws 12 to be screwed into a respective threaded hole 15 provided on the internal face of the other frustoconical body 7, 6 (see FIGS. 3, 4, 6, 7).

In the illustrated example, six connecting screws 12 are used, three on each side. An even number of screws is essential for the balance, and this number may be selected from two upwards, although it should preferably be four or six, spaced at regular intervals around the periphery of the cones.

When the connecting screws 12 have been put in place and tightened, they cause the frustoconical bodies 6, 7 to move towards one another in order to clamp them in the respective housing 10, 11 of the articulation.

Figure 6:
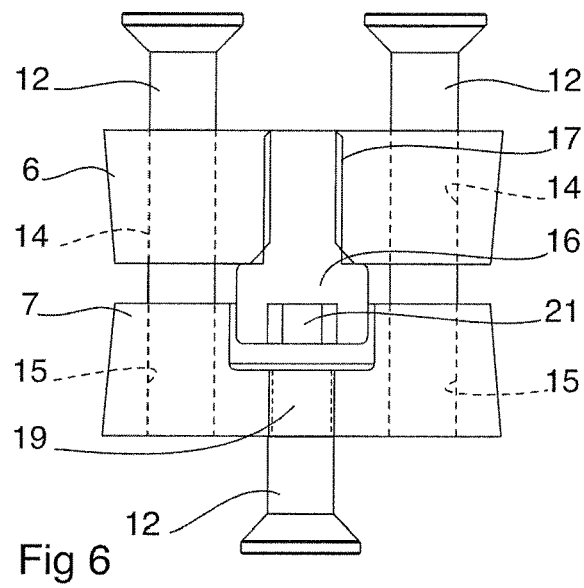
FIG. 6 is a schematic view illustrating the means of connection between the two frustoconical bodies, as well as an expulsion screw for the frustoconical bodies.
Figure 7:
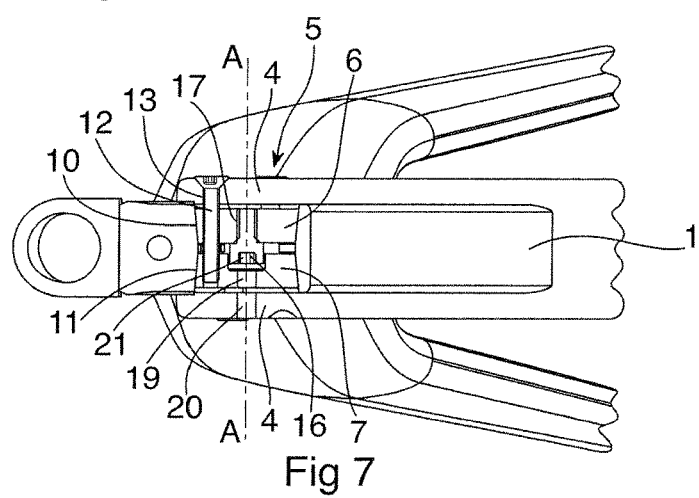
FIG. 7 is a schematic view from above of a section illustrating the position of the frustoconical bodies in the articulation.

According to one essential characterizing feature of the invention, the cone angle α of the frustoconical bodies 6, 7 possesses a sufficiently low value to achieve pinching of the frustoconical bodies 6, 7 in the interior of the housings 10, 11. Half (α/2) of this cone angle α is indicated in FIG. 6. The cone angle α corresponds to an imaginary peak in the prolongation of the conical surfaces of the frustoconical bodies.

Thanks to this characterizing feature, all risk of slipping of the frustoconical bodies 6, 7 in the interior of the housings 10, 11 is eliminated, and the necessary clamping torque is relatively low.

The cone angle α is preferably less than 15° and in particular corresponds to a value of about 10°.

Because of this desired pinching of the frustoconical bodies 6, 7 in the interior of the housings 10, 11, a means of expulsion is generally necessary in order to cause the frustoconical bodies to move out of their housings.

For the convenience of the user, and according to another characterizing feature of the invention, a means for the expulsion of the frustoconical bodies 6, 7 is provided between them. This means of expulsion is capable of initiating the expulsion of the frustoconical bodies 6, 7 from their respective housing 10, 11 in order to loosen them for the purpose of adjusting the inclination of the stem.

This means of expulsion includes an expulsion screw 16 that is screwed into a central threaded hole 17 of one (6) of the frustoconical bodies 6, 7. The head of the expulsion screw 16 is housed in a central recess 18 in the internal face of the other frustoconical body 7, which, in addition, exhibits a central transcurrent hole 19 in alignment with a transcurrent hole 20 provided in one of the arms 4 of the stem in order to provide access from the exterior to the footprint 21 of the head of the expulsion screw 16.

Thus, when the expulsion screw is loosened, the head of the screw comes into contact with the base of the central recess 18 so as to cause the expulsion of the frustoconical bodies 6, 7 in opposite directions by detaching them from the contact surfaces on the respective housing 10, 11.

Figure 2:
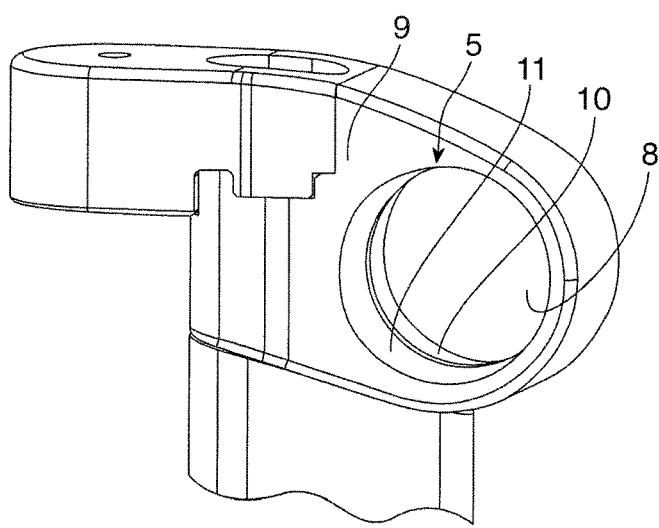
FIG. 2 is a perspective view of the upper extremity of a pivot tube equipped with an articulation for the connection with the stem.
Figures 3, 4:
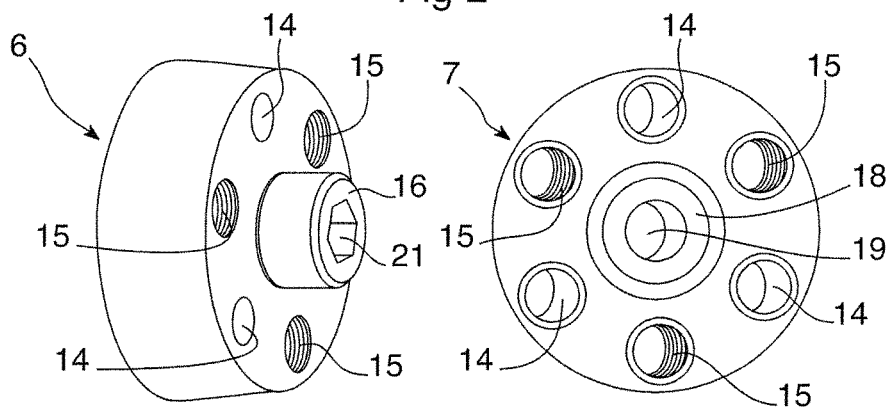
FIGS. 3 and 4 are perspective views of two frustoconical bodies utilized in the articulation.
Figure 5:
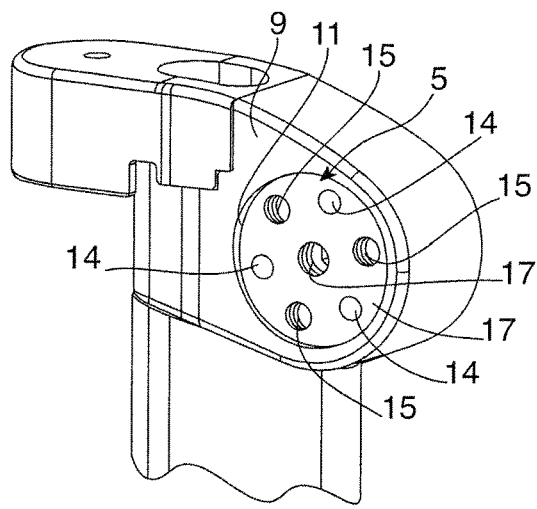
FIG. 5 depicts the frustoconical body of FIG. 4 arranged in a housing of complementary shape on one side of the articulation.

In the second embodiment illustrated in FIGS. 8 to 12, the stem body 1 is composed of two parallel arms 22, each arm being integral with a respective frustoconical body 23, 24 arranged at the extremity of the arm on the internal face thereof (see FIG. 2). These frustoconical bodies 23, 24 are received, just as in the case of the first embodiment, in housings 10, 11 of complementary shape formed to either side of the articulation 5 and constitute a part thereof.

Each frustoconical body 23, 24 is provided with a central threaded hole 25 having the ability to cooperate with means of connection which, in this embodiment, include only a single double-threaded screw 26. This double-threaded screw 26 connects the frustoconical bodies 23, 24 one to the other and causes them to move towards one another when it is screwed in one direction in order to clamp them against the base of the housing 10, 11, and causes them to move apart in order to loosen them when it is screwed in the other direction in order to release them so as to permit the adjustment of the angle of inclination of the stem.

A central section of the double-threaded screw 26 includes two flanges 27, 28 spaced apart from one another constituting a means for the expulsion of the frustoconical bodies 23, 24 by being arranged to either side of a separating wall 29. A circular transcurrent hole 8 is present at the centre of the wall and permits the installation of the double-threaded screw 26 with the flanges 27, 28 to either side of the wall due to the fact that one (28) of the flanges is provided with diametrically opposed flats 30. Thus, by inclining the double-threaded screw 26, it is possible to introduce it in such a way as to position the flanges 27, 28 to either side of the wall. In this way, an expulsion means is obtained when one or other of the flanges abuts against the separating wall 29.

Figure 8:
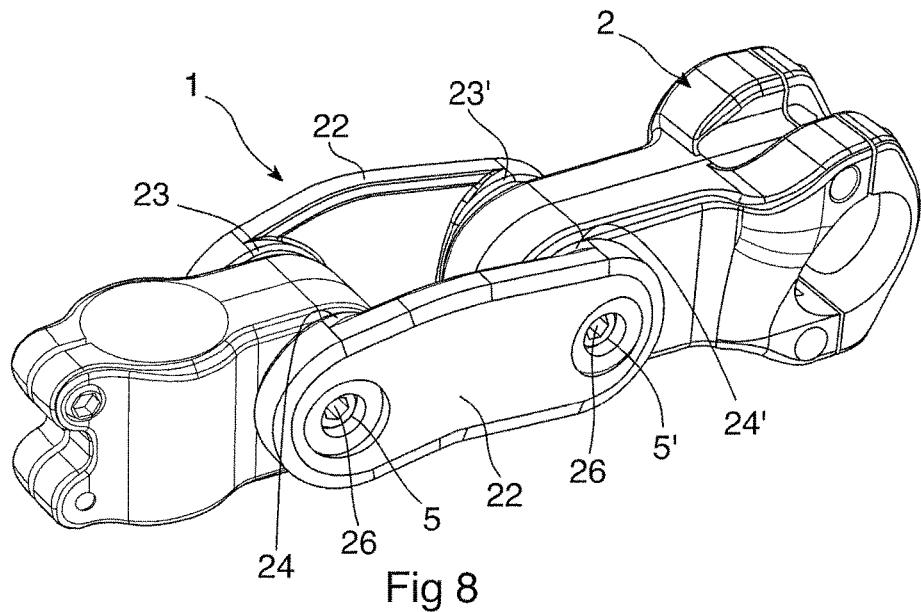
FIG. 8 is an overall view in perspective of a second embodiment of a stem according to the invention including a stem body consisting of two parallel arms.
Figure 9:
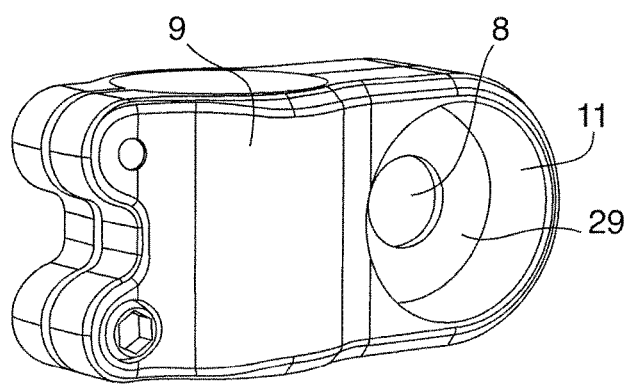
FIG. 9 is a view in perspective of a connecting component intended to be attached to the pivot tube and carrying the articulation of the stem.
Figure 10:
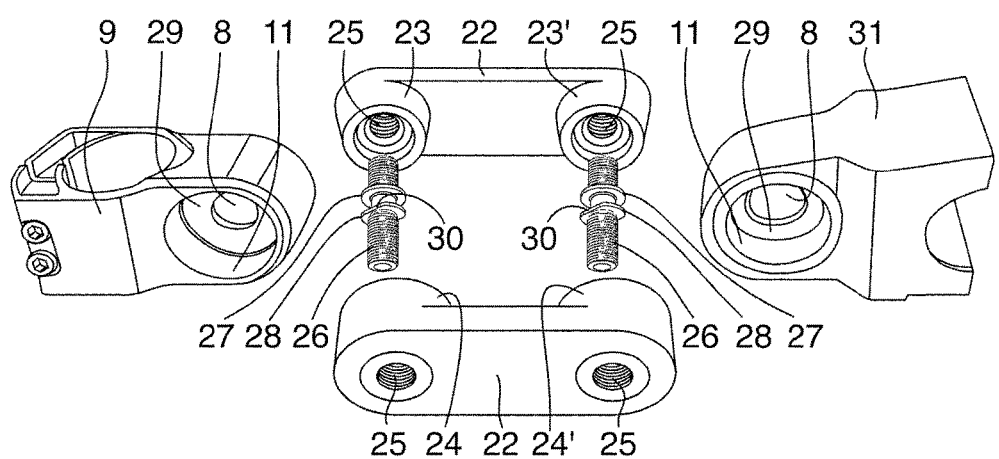
FIG. 10 is an exploded view in perspective of the stem in FIG. 8.
Figure 11:
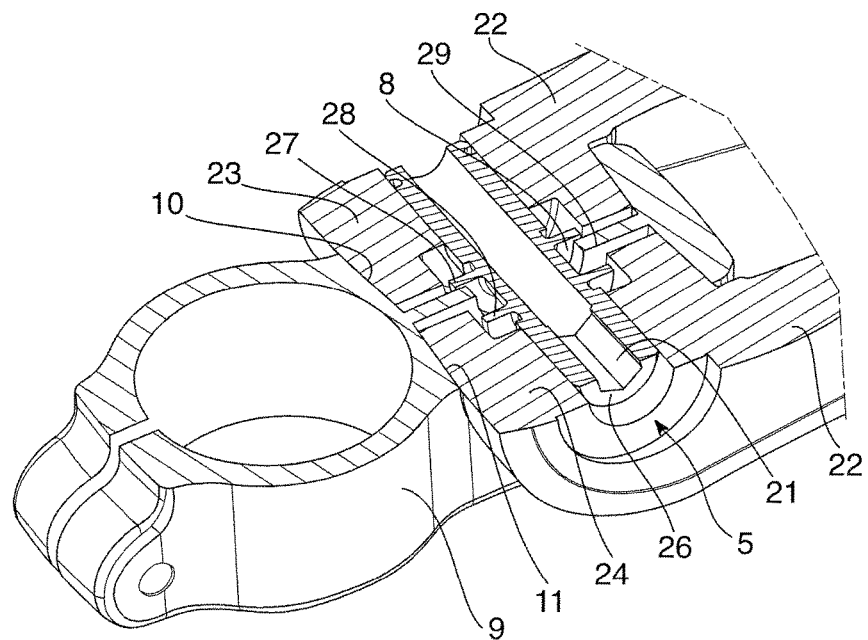
FIG. 11 is a partial schematic view in cross section of the articulation of the stem.
Figure 12:
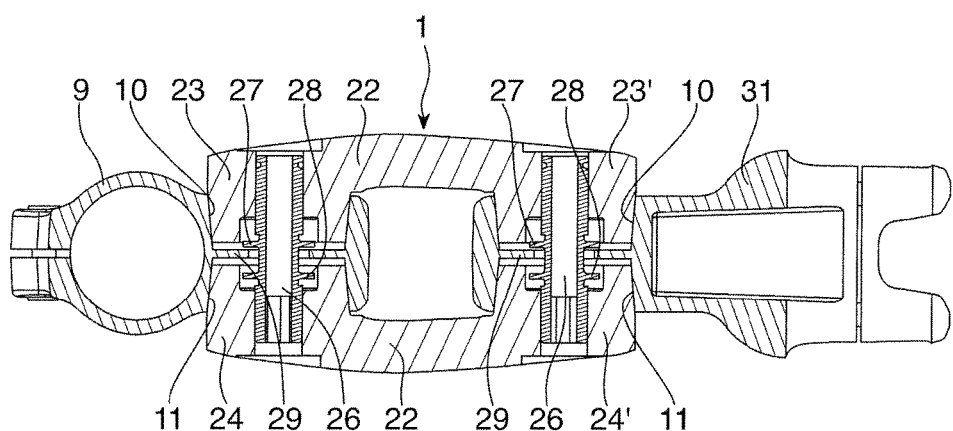
FIG. 12 is a view in longitudinal section of the assembly of the stem in FIG. 8.

FIGS. 8, 10 and 12 depict a stem according to this second embodiment provided with a second articulation 5' similar to that which has been described and which connects the stem 1 to a support member 31 carrying the means 2 for the attachment of the handlebar 3. This second articulation 5' thus likewise includes a second pair of frustoconical bodies 23', 24' that are received in complementary recesses 10, 11 arranged to either side of the said second articulation 5', and the adjustment of the inclination of the support member takes place in the same way as that previously described.

A bicycle stem is obtained as a result, which, thanks to the invention, permits the continuous adjustment of the angle of inclination of the stem, and which permits clamping of the stem in the desired angular position in the absence of all risk of subsequent slipping in the articulation due to the fact that the frustoconical bodies are pinched in the interior of their housings, which is attributable to the low value of the cone angle of the frustoconical bodies. Slipping would otherwise result in loss of adjustment associated with a variation in the height of the handlebar.

The invention is not, of course, restricted to the illustrated and described examples, and a person skilled in the art will be able to come up with variants without departing from the scope of the invention.

The invention claimed is:

1. A bicycle stem with adjustable inclination, comprising:
   a stem body, one extremity of which includes means of attaching a handlebar, and opposite extremity including two parallel arms capable of being connected to a fork pivot tube by an articulation;
   clamping means associated with the articulation and capable of immobilizing the stem in a position corresponding to a chosen angle of inclination;
   a pair of flat surfaced frustoconical bodies forming the clamping means and being connected to internal faces of the corresponding extremities of the arms, the flat surfaced frustoconical bodies constituting part of the articulation by being received in flat surfaced housings of complementary shape formed to one side and the other of the articulation;
   connecting means connecting the flat surfaced frustoconical bodies so as to make possible to move the flat surfaced frustoconical bodies in the respective housing of the articulation, and to loosen by moving them further apart one from the other in order to perform a continuous adjustment of the inclination of the handlebar, wherein a cone angle of the flat surfaced frustoconical bodies possesses a value of less than 15° to obtain pinching of the flat surfaced frustoconical bodies inside the housings of complementary shape,
   wherein a means of expulsion of the flat surfaced frustoconical bodies is provided between them, the means of expulsion being capable of releasing the flat surfaced frustoconical bodies from their respective housing,
   wherein the means of expulsion includes an expulsion screw that is screwed into a central threaded hole of one of the flat surfaced frustoconical bodies, and of which the head is accommodated in a central recess in the internal face of the other flat surfaced frustoconical body, which further exhibits a central transcurrent hole aligned with a transcurrent hole of one of the arms so as to provide access from the outside to the head of the expulsion screw so that, when the screw is unscrewed, the flat surfaced frustoconical bodies are loosened from their respective housing.

2. The bicycle stem according to claim 1, wherein the cone angle is about 10°.

3. The bicycle stem according to claim 1, wherein the connecting means include a plurality of screws extending via a respective first bore provided alternately in one and the other of the arms of the stem body, the first bore being capable of alignment with a second bore provided in one of the flat surfaced frustoconical bodies so as to allow the screws to be screwed into a respective threaded hole provided on the internal face of the other flat surfaced frustoconical body.

4. The bicycle stem according to claim 1, wherein the flat surfaced frustoconical bodies are added components.

5. The bicycle stem according to claim 1, wherein the stem body is formed by two parallel arms, and in that each flat surfaced frustoconical body of the pair of flat surfaced frustoconical bodies is integral with a respective arm.

6. The bicycle stem according to claim 5, wherein the connecting means include a double-threaded screw cooperating with a central threaded hole on the internal face of the opposite flat surfaced frustoconical bodies.

7. The bicycle stem according to claim 6, wherein the double-threaded screw includes in a central section two spaced flanges, one of which includes on a periphery two diametrically opposed flats permitting the double-threaded screw to be introduced, by inclining it, through a central hole of a separating wall separating the housings from the flat surfaced frustoconical bodies in order to position the flanges to either side of the separating wall in such a way that an expulsion means is obtained when one or other of the flanges abuts against the separating wall.

8. The bicycle stem according to claim 5, wherein the stem includes, at its extremity for the attachment of a handlebar, a second pair of flat surfaced frustoconical bodies accommodated in complementary recesses provided in a support member carrying the means for the attachment of a handlebar, in such a way as to form a second articulation.

9. A bicycle, said bicycle equipped with said bicycle stem according to claim 1.

10. A bicycle stem with adjustable inclination, comprising:
   a stem body, one extremity of which includes means of attaching a handlebar, and opposite extremity including two parallel arms capable of being connected to a fork pivot tube by an articulation;
   clamping means associated with the articulation and capable of immobilizing the stem in a position corresponding to a chosen angle of inclination;
   a pair of flat surfaced frustoconical bodies forming the clamping means and being connected to internal faces of the corresponding extremities of the arms, the flat surfaced frustoconical bodies constituting part of the articulation by being received in flat surfaced housings of complementary shape formed to one side and the other of the articulation;
   connecting means connecting the flat surfaced frustoconical bodies so as to make possible to move the flat surfaced frustoconical bodies in the respective housing of the articulation, and to loosen by moving them further apart one from the other in order to perform a continuous adjustment of the inclination of the handlebar, wherein a cone angle of the flat surfaced frustoconical bodies possesses a value of less than 15° to obtain pinching of the flat surfaced frustoconical bodies inside the housings of complementary shape,
   wherein a means of expulsion of the flat surfaced frustoconical bodies is provided between them, the means of expulsion being capable of releasing the flat surfaced frustoconical bodies from their respective housing,
   wherein the stem body is formed by two parallel arms, and in that each flat surfaced frustoconical body of the pair of flat surfaced frustoconical bodies is integral with a respective arm,
   wherein the connecting means include a double-threaded screw cooperating with a central threaded hole on the internal face of the opposite flat surfaced frustoconical bodies.

11. A bicycle stem with adjustable inclination, comprising:
   a stem body, one extremity of which includes means of attaching a handlebar, and opposite extremity including two parallel arms capable of being connected to a fork pivot tube by an articulation;
   clamping means associated with the articulation and capable of immobilizing the stem in a position corresponding to a chosen angle of inclination;
   a pair of flat surfaced frustoconical bodies forming the clamping means and being connected to internal faces of the corresponding extremities of the arms, the flat surfaced frustoconical bodies constituting part of the articulation by being received in flat surfaced housings of complementary shape formed to one side and the other of the articulation;
   connecting means connecting the flat surfaced frustoconical bodies so as to make possible to move the flat surfaced frustoconical bodies in the respective housing of the articulation, and to loosen by moving them further apart one from the other in order to perform a continuous adjustment of the inclination of the handlebar, wherein a cone angle of the flat surfaced frustoconical bodies possesses a value of less than 15° to obtain pinching of the flat surfaced frustoconical bodies inside the housings of complementary shape,
   wherein a means of expulsion of the flat surfaced frustoconical bodies is provided between them, the means of expulsion being capable of releasing the flat surfaced frustoconical bodies from their respective housing,
   wherein the stem body is formed by two parallel arms, and in that each flat surfaced frustoconical body of the pair of flat surfaced frustoconical bodies is integral with a respective arm,
   wherein the connecting means include a double-threaded screw cooperating with a central threaded hole on the internal face of the opposite flat surfaced frustoconical bodies, and
   wherein the double-threaded screw includes in a central section two spaced flanges, one of which includes on a periphery two diametrically opposed flats permitting the double-threaded screw to be introduced, by inclining it, through a central hole of a separating wall separating the housings from the flat surfaced frustoconical bodies in order to position the flanges to either side of the separating wall in such a way that an expulsion means is obtained when one or other of the flanges abuts against the separating wall.

\* \* \* \* \*